United States Patent
Mainzer et al.

(10) Patent No.: US 9,500,311 B2
(45) Date of Patent: Nov. 22, 2016

(54) DIRECTIONAL INSERTION TOOL

(71) Applicants: Jeff Mainzer, Cary, IL (US); Dennis R. Jarnecke, River Forest, IL (US)

(72) Inventors: Jeff Mainzer, Cary, IL (US); Dennis R. Jarnecke, River Forest, IL (US)

(73) Assignee: Gas Technology Institute, Des Plaines, IL (US)

( * ) Notice: Subject to any disclaimer, the term of this patent is extended or adjusted under 35 U.S.C. 154(b) by 23 days.

(21) Appl. No.: 14/533,848

(22) Filed: Nov. 5, 2014

(65) Prior Publication Data

US 2015/0129048 A1    May 14, 2015

Related U.S. Application Data

(60) Provisional application No. 61/901,901, filed on Nov. 8, 2013.

(51) Int. Cl.
| | |
|---|---|
| *F16L 41/06* | (2006.01) |
| *F16L 41/16* | (2006.01) |
| *F16L 55/46* | (2006.01) |
| *F16L 55/134* | (2006.01) |

(52) U.S. Cl.
CPC .............. *F16L 41/06* (2013.01); *F16L 55/134* (2013.01); *F16L 55/46* (2013.01); *Y10T 137/0458* (2015.04); *Y10T 137/612* (2015.04)

(58) Field of Classification Search
CPC ....... F16L 41/06; F16L 55/134; F16L 55/46; F16L 2101/12; Y10T 137/612; Y10T 137/6123; B08B 9/055; B08B 2209/055
See application file for complete search history.

(56) References Cited

U.S. PATENT DOCUMENTS

| | | | | |
|---|---|---|---|---|
| 3,911,750 | A * | 10/1975 | Prasher | G01N 29/265 73/866.5 |
| 4,631,967 | A * | 12/1986 | Welker | G01F 15/185 73/861.25 |
| 5,138,755 | A * | 8/1992 | Evans | B25B 27/0028 29/256 |
| 5,410,920 | A * | 5/1995 | Westwick | F16L 41/04 73/863.85 |
| 5,621,181 | A * | 4/1997 | Waterman | G01N 17/046 73/866.5 |
| 6,286,542 | B1 * | 9/2001 | Morain | E03F 3/06 137/317 |
| 6,357,470 | B1 * | 3/2002 | Evans | F16L 41/16 137/315.01 |
| 8,359,937 | B2 * | 1/2013 | Evans | G01N 17/046 73/865.8 |
| 2002/0083976 | A1 * | 7/2002 | Beals | F16L 7/00 137/317 |
| 2007/0051192 | A1 * | 3/2007 | Penza | F16K 7/10 73/865.8 |
| 2010/0236639 | A1 * | 9/2010 | Penza | F16L 41/06 137/15.15 |
| 2012/0291561 | A1 * | 11/2012 | Evans | G01N 17/046 73/788 |
| 2013/0019684 | A1 * | 1/2013 | Krywyj | F16L 55/28 73/592 |

* cited by examiner

*Primary Examiner* — Craig Schneider
*Assistant Examiner* — Kevin Barss
(74) *Attorney, Agent, or Firm* — Pauley Erickson & Kottis

(57) ABSTRACT

A device and method for inserting a tool into a pipeline transporting a fluid. The device includes a housing that is attachable to a vertical fitting applied on the pipeline, and a launch tube supported by the housing and including a tool passageway through which a tool is fed. The launch tube moves relative to the housing to raise and lower a shoe at an end of the launch tube into the pipeline. The shoe is and adapted to insert a tool into the pipeline at an angle to the launch tube.

20 Claims, 3 Drawing Sheets

DIRECTIONAL INSERTION TOOL

CROSS REFERENCE TO RELATED APPLICATION(S)

This application claims the benefit of U.S. Provisional Patent Application, Ser. No. 61/901,901, filed on 8 Nov. 2013. The Provisional Application is hereby incorporated by reference herein in its entirety and is made a part hereof, including but not limited to those portions which specifically appear hereinafter.

BACKGROUND OF THE INVENTION

Field of the Invention

This invention relates to an insertion system for inserting a tool or other device into an existing pipeline, and more particularly, provides a method and apparatus for vertical or angled tool entry into the pipeline.

Description of Related Art

Unlocatable plastic pipe has remained one of the greatest risks for the natural gas industry (risk of third party damage). Tracer wire that is broken or missing, never installed, inaccessible, and/or distorted signals from nearby utility lines are causes for unlocatable PE pipe. As a result, camera systems, locating fish tapes, and other locating tools are being developed to insert into gas and water pipes as a means to inspect, locate, and perform inline surveys of the pipes. In addition, inflatable bags are often used to control the flow of fluid in the pipes. These bags systems also require the deployment into the pipes in a specific direction.

SUMMARY OF THE INVENTION

This invention relates to a process and apparatus for inserting a tool into a fluid pipe through an entry system. As used herein, the term "tool" refers to any suitable device for inserting into a pipe for any known function, such as, without limitation, a camera, fish tape, or other locating device, an inflatable bag or other flow adjusting device, or a snake, pig or other pipe rodding or cleaning device. The entry system device accesses the pipe through a valve attached to a fitting attached to the pipe, and via a hole made within the fitting and through the pipe. The device includes a launch tube that is extended through the valve and into the pipe. A directional shoe located at the end of the launch tube provides for directing the tool within the desired path within the pipe. The directional shoe may be removed and replaced with appropriate attachments to allow different and various types and sizes of tools entry into the pipe. The directional shoe also provides protection against the edges of the hole cut into the pipe. The entry system device of this invention allows for both angled entry and vertical entry into various size pipes, including small diameter pipes (e.g., 2-inch), which cannot be accomplished with other currently known systems.

The device and method of this invention incorporates commonly used practices in the pipeline industry, such as for example, the installation of fittings and tapping (i.e., cutting a hole) the fittings and pipe to allow the device to enter the pipe. This device and method also can incorporate commonly used practices to seal the cables, tethers, and push rods connected to or used with the device so as to not allow fluid to escape during use.

DESCRIPTION OF THE ILLUSTRATED EMBODIMENTS

The device and method of this invention allows for vertical insertion, in addition to angled entry, of tools, etc. into fluid filled pipes. The device can be used with pipes of various diameters, including smaller diameter pipes. The insertion device of this invention allows for directional control of the tool being inserted.

Figure 1:
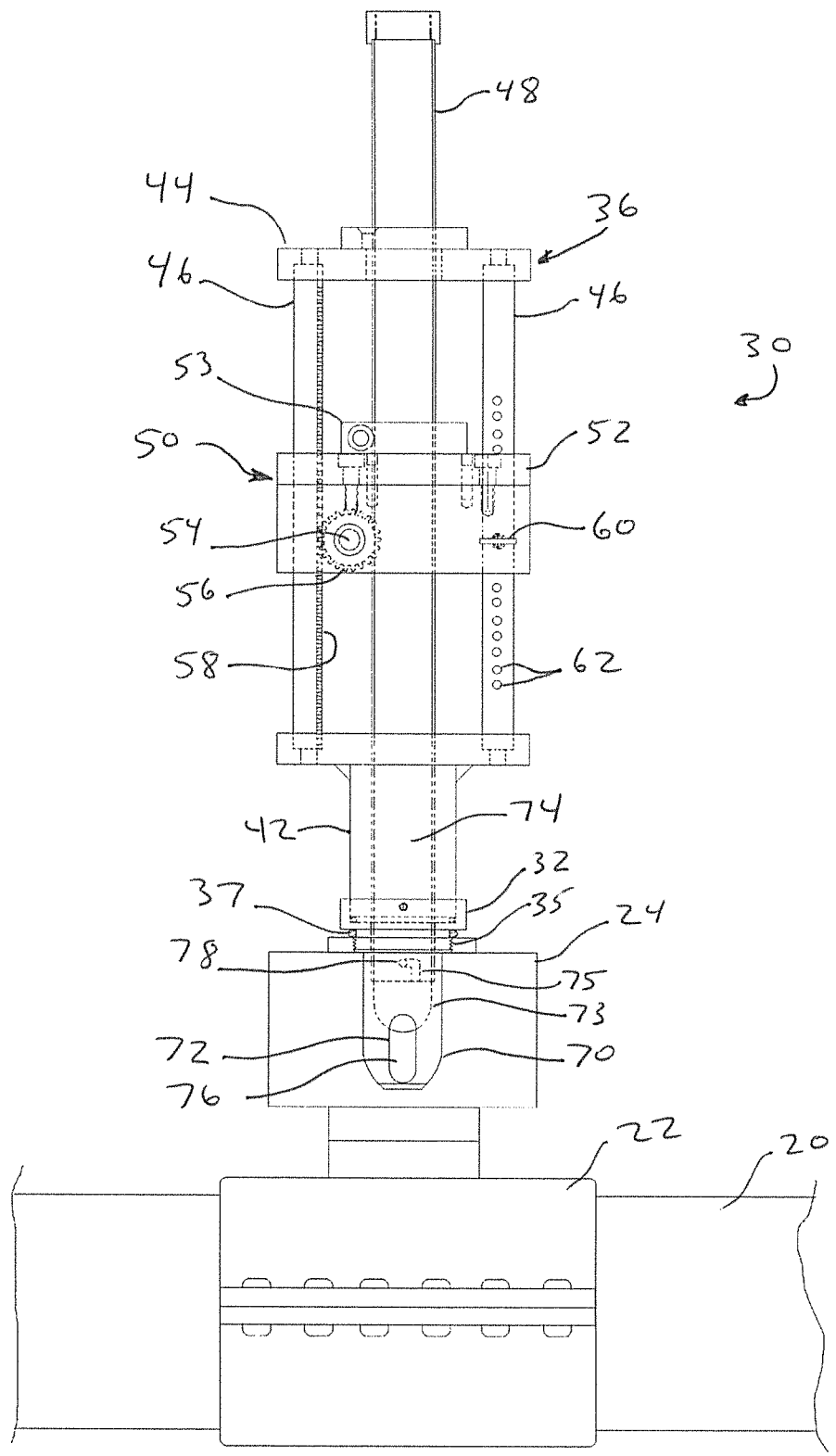
FIG. 1 illustrates an insertion system attached to a pipeline, according to one embodiment of this invention.

FIG. 1 shows an insertion device 30 according to one embodiment of this invention connected to a pipeline 20. A vertical fitting 22, such as are known in the art, is attached to the pipe 20, and covers and/or surrounds an opening (not shown) cut into the pipe 20. A valve 24, such as a known gate valve, is attached to the fitting 22 to allow the tapping of the pipe 20 and the attachment of the device 30. The valve 24 can be opened and closed to allow access to the opening cut within the pipe 20.

The device 30 can be connected to the valve 24 by any known connection means, such as being bolted or threaded on. In the embodiment of FIG. 1, the device 30 includes a threaded end 35 that corresponds to a threaded receiver of the valve 24. An O-ring 37 or other sealing member(s) can be used as needed to seal the connection between the valve 24 and the device 30. In one embodiment of this invention, the device 30 includes a reversing mechanism that allows the device 30 to rotate in-place at an angle, such as 90° or 180°, to allow for directional insertion in more than one direction of the pipe 20, without the need to remove the device 30 for rotation. In one embodiment, the device 30 includes a sealed bearing 32 at the threaded end 35 that allows rotation with respect to the valve 24.

In the embodiment shown in FIG. 1, the device 30 includes a support housing 36 that includes or is attached to the threaded end 35. The housing 36 includes a base 42 connected to the threaded end 35, and a top plate 44 connected to the base 42 by four legs 46. The housing supports a launch tube 48 that moveably extends through openings in the top plate 44, base 42, bearing 32, and threaded end 35.

Figure 2:
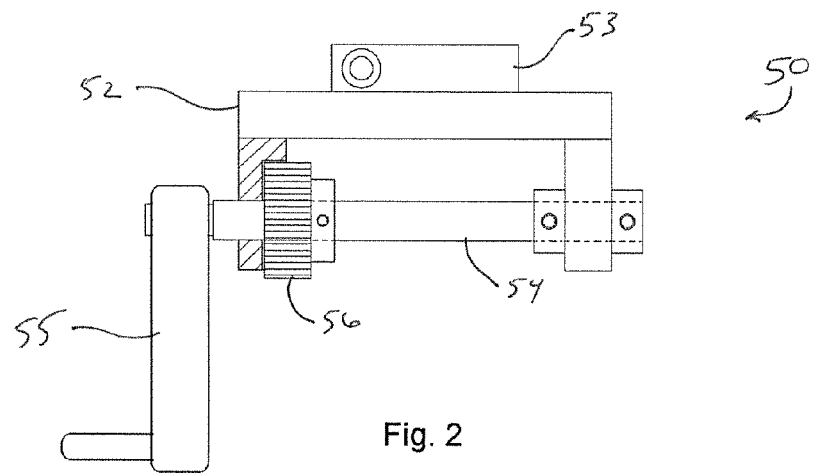
FIG. 2 shows a partial sectional view of an insertion mechanism according to one embodiment of this invention.

The launch tube 48 is raised and lowered with respect to the housing 36 by an insertion mechanism. The insertion mechanism can be any suitable mechanism for lowering or otherwise inserting the launch tube 48. The launch tube 48 can be manually or mechanically raised and lowered, and desirably can be locked into place by, for example, a set screw or collar. In FIGS. 1 and 2, the insertion mechanism 50 includes a cog system to raise and lower the launch tube 48. In FIG. 1, the insertion mechanism 50 includes a moveable plate 52 that moves up and down legs 46. The moveable plate includes a gear shaft 54 and a spur gear 56. A linear gear 58 is attached to or integrated into one of the legs 46 between the housing 36 and the launch tube 48. Turning the gear shaft 54 causes the gear 56 to move along the linear gear 58 to move the plate 52 along the legs 46. The moveable plate 52 is fixed to the launch tube 48 by locking ring 53, and movement of the plate 52 raises or lowers an end of the launch tube 48, such as through the valve 24 and into the pipe 20.

The plate 52 and insertion mechanism 50 can be operated by any suitable mechanism. In FIG. 2, a handle 55 is attached to the gear shaft 54 for turning the spur gear 56. Any suitable powered motor can additionally or alternatively be used. The insertion mechanism 50 desirably includes a locking feature to lock the launch tube 48 in place against pressure from within the pipe 20. In FIG. 1, the locking feature is embodied as a retractable plunger pin 60 that extends into any of a plurality of spaced bores 62 machined into and along one of the legs 46.

Figure 3:
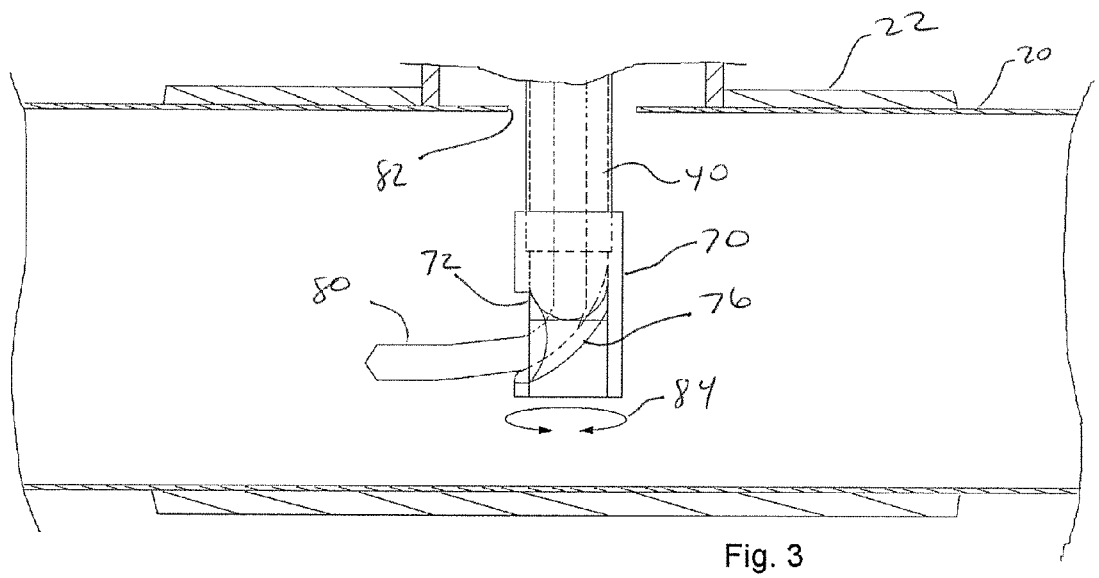
FIG. 3 illustrates a tool being fed into a pipeline through a directional shoe according to one embodiment of this invention.
Figure 4:
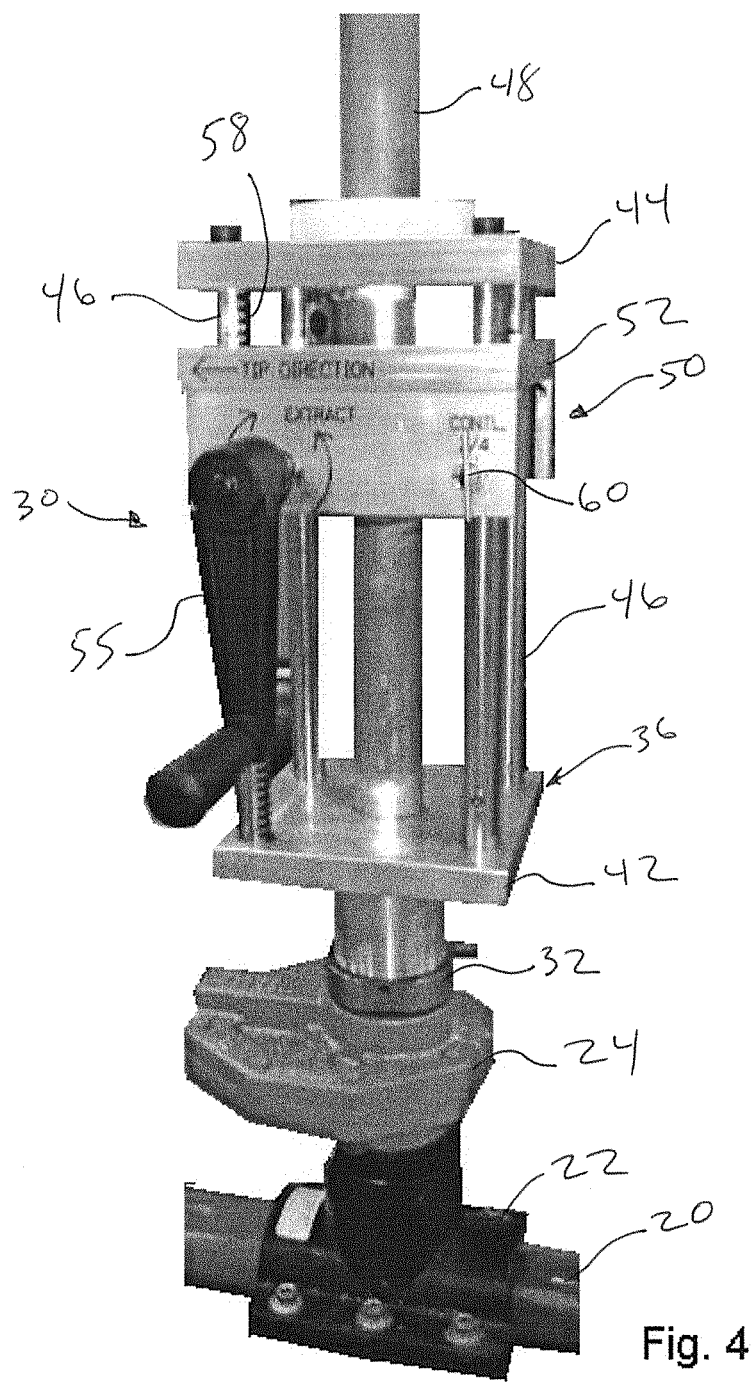
FIG. 4 illustrates an insertion system attached to a pipeline, according to one embodiment of this invention.

As shown in FIG. 1, a directional shoe 70 is attached at the end of the launch tube 48. The shoe 70 acts to direct and insert a tool into the pipeline at an angle to the launch tube, such as shown in FIG. 3. The shoe 70 includes a tool opening 72 disposed at an angle to a tool passageway 74 of the launch tube 48. An angled surface 76 extends between the tool passageway 74 and the tool opening 72, and within a shoe passageway 73, to turn the tool to the desired direction for insertion into the pipeline. In embodiments of this invention, the shoe is desirably removable, and can be replaced by a shoe of a different size and/or configuration, or a different type of launch tube end. In FIG. 1, the shoe 70 includes a pin 78 for corresponding insertion and rotational locking within an L-shaped tip slot 75 cut into the launch tube 48. The angled surface 76 and passageway 73 of the shoe 70 allows improved tool entry into small diameter pipes compared to current curved and/or flexible spring systems.

FIG. 3 shows a shoe 70 and bottom end of the launch tube 48 in a lowered position and extended beyond the threaded end 35 of the housing 36. A tool 80 is passed through the tool passageway 74 of the launch tube 48 and upon contact with the angled surface 76 of the shoe the tool 80 is inserted into the pipe in a specific direction. The shoe 80 also protects the tool and/or the tool cable, tether, push rod, etc. from any sharp edges of the hole 82 made in the pipe 20 during insertion and removal.

To directionally insert the tool 80 into the pipe 20, the device 30 is attached, such as perpendicularly as shown in FIG. 1, to the valve 24. The valve 24 is opened, and the launch tube 48 is lowered via the insertion mechanism 50 to insert the shoe 70 into the pipe 20. The tool 80 can then be manually or machine fed through the central passage 74 of the launch tube 48 and through the angled opening 72 of the shoe 70 to direct the tool 80 in the desired direction of the pipe 20. To direct the tool 80 in the opposite direction, the tool 80 is retracted into the shoe 70 and the housing 36, launch tube 48, and shoe 70 are rotated to face the other direction of the pipe 20, such as illustrated by arrow 84. The device desirably includes a directional marking, such as an arrow, applied to or formed on the device to indicate the direction that the shoe opening faces during use.

Thus the invention includes a device and method for directionally inserting a tube from a vertical (i.e., perpendicular) position relative a pipeline. The device and method also is particularly beneficial for inserting a tool within smaller pipes by directing the tool with the device during tool insertion.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A device for inserting a tool into a pipeline transporting a fluid, the device comprising:
   a housing including a rotational seal;
   a launch tube supported by the housing and including a tool passageway, wherein the launch tube is rotatable via the rotational seal; and
   a shoe at an end of the launch tube and adapted to insert a tool into the pipeline at an angle to the launch tube.

2. The device of claim 1, wherein the shoe comprises a tool opening disposed at an angle to the tool passageway of the launch tube.

3. The device of claim 1, wherein the shoe comprises an angled surface or opening to direct the tool being inserted into the pipeline in a specific direction.

4. The device of claim 1, wherein the shoe is removable.

5. The device of claim 1, wherein the launch tube is connected perpendicular to the pipeline to insert the shoe.

6. The device of claim 1, wherein the launch tube is rotatable to rotate the shoe with respect to the pipeline.

7. The device of claim 6, wherein the rotational seal comprises a sealed rotational bearing.

8. The device of claim 1, further comprising an insertion mechanism that moves the launch tube relative to the housing to raise and lower the shoe into the pipeline.

9. The device of claim 8, wherein the insertion mechanism comprises a cog system to raise and lower the launch tube.

10. The device of claim 9, wherein the insertion mechanism comprises a linear gear connecting the housing and the launch tube.

11. The device of claim 8, wherein the insertion mechanism comprises a locking feature to lock the launch tube in place against pressure from within the pipeline.

12. The device of claim 1, wherein the housing connects to a vertical fitting that covers or surrounds an opening within the pipeline.

13. The device of claim 12, further comprising a valve connecting the housing and the vertical fitting.

14. The device of claim 13, wherein the rotational seal connects the housing to the valve.

15. The device of claim 1, wherein the housing connects to a vertical fitting that covers or surrounds an opening within the pipeline, and the launch tube is rotatable with respect to the fitting via the rotational seal.

16. The device of claim 1, further comprising a valve connecting the housing to the pipeline wherein the launch tube is rotatable with respect to the valve via the rotational seal.

17. The device of claim 1, further comprising a valve connecting the housing to the pipeline wherein the rotational seal connects the housing to the valve, and the housing and the launch tube are rotatable with respect to the valve via the rotational seal.

18. A method of inserting a tool into a pipeline transporting a fluid, the method comprising:
   connecting a fitting to the pipeline;
   attaching an insertion device to the fitting, the insertion device including a housing rotatable with respect to the fitting, a launch tube moveable with respect to the housing, and a shoe at an insertion end of the launch tube;
   lowering the launch tube and inserting the shoe through an opening in the pipeline;
   passing the tool through the launch tube and the shoe and into the pipeline; and
   angling the tool for insertion by contact with an angled surface within the shoe.

19. The method of claim 18, wherein a reversing mechanism connects the housing to the fitting and further comprising rotating the launch tube via the reversing mechanism to insert the tool in a second direction of the pipeline.

20. A device for inserting a tool into a pipeline transporting a fluid, the device comprising:
- a housing;
- a launch tube supported by the housing and including a tool passageway;
- a shoe at an end of the launch tube and adapted to insert a tool into the pipeline at an angle to the launch tube; and
- a reversing mechanism connected to the housing and adapted to rotate the launch tube in-place in more than one direction of the pipeline without removing the device from the pipeline for rotation.

* * * * *